UNITED STATES PATENT OFFICE.

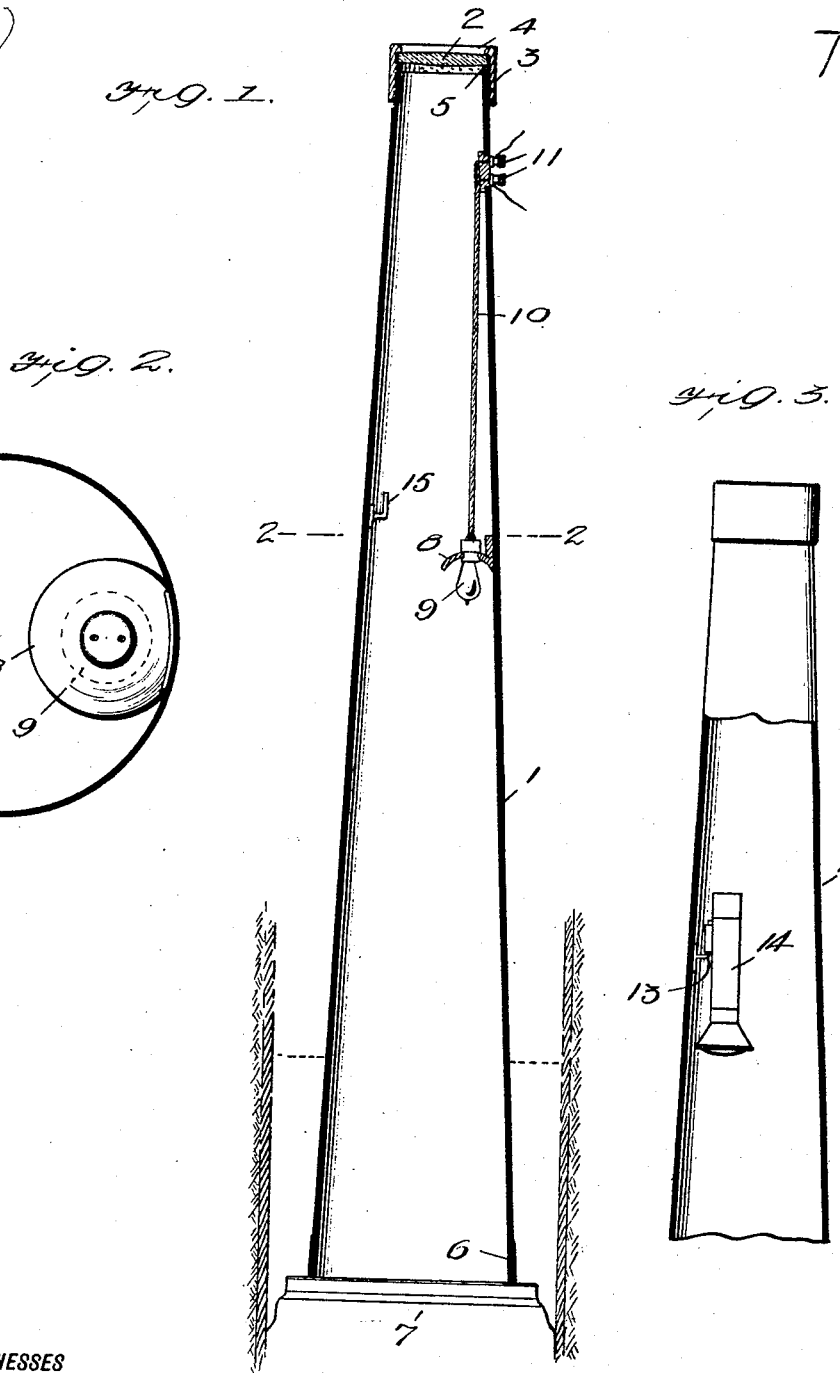

ROBERT ATKINSON CASSON, OF DULUTH, MINNESOTA.

METER-READING DEVICE.

1,236,265.   Specification of Letters Patent.   Patented Aug. 7, 1917.

Application filed January 23, 1917. Serial No. 143,938.

*To all whom it may concern:*

Be it known that I, ROBERT A. CASSON, a citizen of the United States, and a resident of Duluth, in the county of St. Louis and State of Minnesota, have invented certain new and useful Improvements in Meter-Reading Devices, of which the following is a specification.

My invention is an improvement in meter reading devices, and has for its object to provide mechanism of the character specified, by means of which meters submerged by dirty water may be read.

In the drawings:

Figure 1 is a longitudinal section of an embodiment of the invention,

Fig. 2 is an enlarged section on the line 2—2 of Fig. 1.

Fig. 3 is a side view partly in section of a modified construction.

In the embodiment of the invention shown in Figs. 1 and 2, a tapering casing 1 is provided, open at the large end, and having the smaller end closed by a disk 2 of transparent material, as for instance glass. This disk is held in place on the casing by a collar 3, the said collar having at one end an internally extending rib 4 overlying the edge of the disk and being internally threaded at the other to engage the casing. A packing ring 5 is arranged between the end of the casing and the disk, and the joint is air tight.

The large end of the casing is reinforced as shown at 6, and the said end is of a diameter to fit the face of the meter indicated at 7 and to encircle the said face so that the said meter may be read by looking through the casing. Within the casing, and intermediate the ends thereof, is arranged a reflector 8, the said reflector being secured to the casing wall, and this reflector carries an incandescent light bulb 9 at its center, the arrangement being such that the light of the bulb will be reflected toward the large end of the casing. The bulb is supplied with light in the present instance, by lead wires 10, which are connected with the light in the usual manner, and with binding posts 11 held on the wall of the casing near the small end thereof and insulated from the said wall. Current may be supplied to the light from any suitable source of supply, the lead wires from the source being connected with the binding posts.

If desired, the bulb may be dispensed with, and an ordinary flash light may be used instead. This arrangement is shown in Fig. 3, wherein the casing 12 is provided with a hook 13 at a suitable point in its length, the said hook being adapted to support the flash light indicated at 14. The embodiment shown in Fig. 1 is also provided with a hook 15 for a like purpose.

In operation, the device is used as indicated in Fig. 1, the large end of the funnel being forced downward through the water until it engages the face of the meter. The air pressure in the casing will force the water in the casing outward so that it does not interfere with the reading of the meter, which is illuminated by the light rays reflected thereon.

I claim:

A device of the character specified, comprising a tapering casing having its large end open and adapted to fit about a meter to permit the same to be read through the casing, a disk of transparent material held at the small end of the casing, an air-tight connection between the said disk and the casing for driving out the water over the meter when the casing is placed about the same, the casing having means intermediate its ends for supporting an illuminating means to illuminate the face of the meter.

ROBERT ATKINSON CASSON.

Witnessed by—
 J. M. HALLING,
 J. W. STEWART.

Copies of this patent may be obtained for five cents each, by addressing the "Commissioner of Patents. Washington, D. C."